United States Patent Office 3,042,822
Patented July 3, 1962

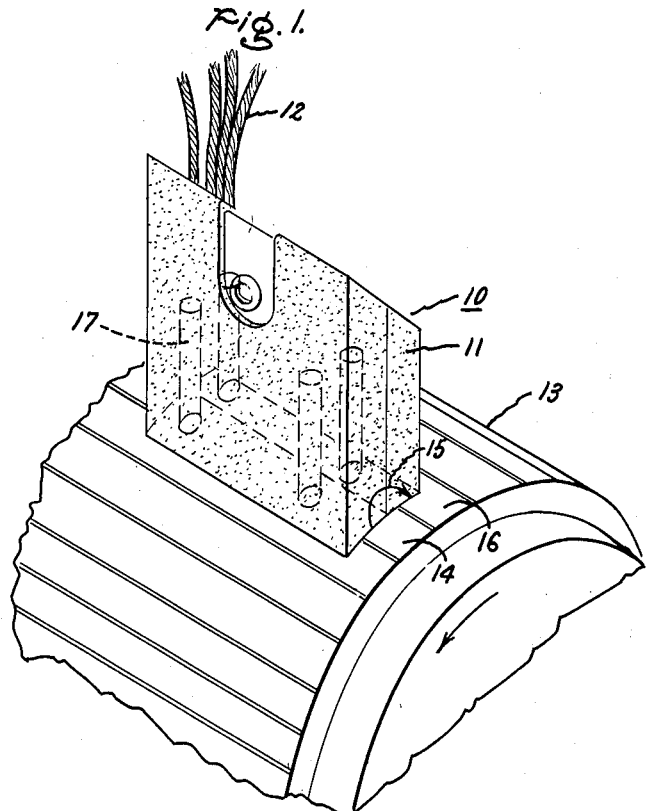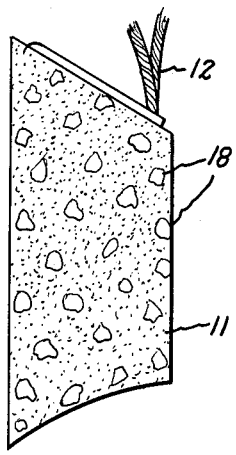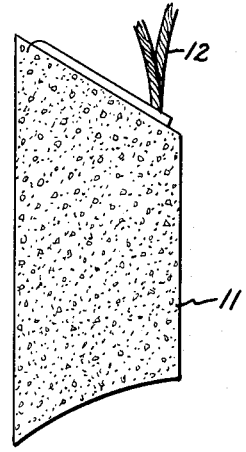

3,042,822
TREATED CARBON BRUSH
Robert H. Savage and Maurice Guarnier, Schenectady, N.Y., assignors to General Electric Company, a corporation of New York
Filed Nov. 21, 1960, Ser. No. 70,706
17 Claims. (Cl. 310—228)

This invention relates to commutation or collection of current in electrical devices, such as for example, motors and generators, and more particularly, to sliding conductors or brushes as utilized in the above-described apparatus.

Contact carbon brushes for collection and delivering electrical current are predominantly carbon and/or graphite. Experience has demonstrated that ordinary carbonaceous material brushes rapidly fail due to excessive wear when operating under conditions of high altitude and low humidity. Rapid wear of carbon brushes may also occur under other conditions of extremely low humidity, such as, at sub-zero temperatures and low altitudes. Excessive brush wear has constituted a problem in the development of aircraft power equipment and other power equipment for extreme conditions as high altitude and high speed operation. In an electrical device such as a motor or generator, an ordinary carbonaceous material brush may take the form of that brush as described in U.S. Patent 2,736,830, Savage, which consists of unimpregnated graphitic carbon or mixtures of carbon and metallic components, such as, copper and silver. The brush may also be provided with inclusions, such as, cavities, apertures, or recesses extending away from the contact engaging surface of the brush, such inclusions being charged with a special non-carbonaceous solid commutating lubricating material which is adapted to engage the moving surface of a current transfer device. The term "graphitic carbon" as used, is a generic term intended to mean elemental carbon which shows an X-ray diffraction pattern including the lines characteristic of a graphite lattice, and also includes graphite. The word "brush" is hereinafter employed to include the term "graphitic carbon" and "carbonaceous material." A more common lubricant material to be incorporated in a brush as described is molybdenum disulfide and various other equivalent sulfides in general. Modifications in the film forming characteristics of molybdenum disulfide containing brushes, and also of the brush as described in the aforementioned Savage Patent, 2,736,830, are adequately described and illustrated in U.S. Patent 2,946,907, Titus. These various additions not only improve performance by general lubrication, but also substantially improve high altitude performance and especially in connection with wear rate.

While in most applications, brushes as described in the aforementioned patents have become quite standardized, they must also entail certain characteristics which will prevent rapid wear deterioration or dusting under extreme conditions. In aircraft applications, or generally low pressure, or vacuum conditions, the life of the brush is most important. Brush qualifications thus entail minimum hour-life conditions for their acceptance.

A further desired characteristic in many machine or apparatus applications is a brush resistivity which is matched to the characteristics of the machine or apparatus. More particularly, a certain resistivity is necessary to provide dissipation of unwanted energy from the system. A further characteristic of resistivity may lie in the temperature coefficient thereof which should be such to prevent injurious variances in conductivity during operating conditions. Furthermore, the resistivity of a given brush may be lowered only in certain applications where the lowering is not detrimental to operating requirement, and where such is the case, then the efficiency of the apparatus is increased within certain limitations. In many instances, merely lowering the resistivity of carbon brushes may result in some adverse effects such as arcing and poor wear characteristics of the brush to offset the advantages to be gained by lowering.

Accordingly, it is an object of this invention to provide an improved electrical brush.

It is another object of this invention to provide a brush with increased life.

It is another object of this invention to provide an improved electrical brush having a lower resistivity.

It is another object of this invention to provide an improved electrical brush having a lower and more positive temperature coefficient of resistivity.

It is a further object of this invention to provide a brush containing a vanadium compound.

It is yet another object of this invention to provide an improved lubricating long-life brush containing low resistivity element in the form of vanadium pentoxide.

Briefly described, this invention in one preferred form includes the incorporation of a vanadium compound with an electrical contact brush in order to increase the hour life and lower and change the resistivity thereof.

This invention will be better understood when taken in connection with the following description and the drawing in which:

FIG. 1 is a partial view of a commutator device with a standard brush as described in the Savage patent, in an operating relationship;

FIG. 2 is a modification of the brush of FIG. 1 showing lubricant chunks; and

FIG. 3 is a further modification of the invention of FIG. 1 showing dispersed particles.

Referring now to FIG. 1, brush 10 is illustrated as a carbonaceous body 11 having a stranded type of pig tail connector 12 connected thereto. Brush 10 is shown in operative engagement and relationship with a standard and well known type of commutator 13. In the operation of the brush of FIG. 1, assuming a generator, for example, two current paths are usually set up. The first current path is the straight forward and well understood one wherein current travels from a commutator bar 14 and through the brush body 11 and pig tail connector 12. The other circuit, as illustrated by arrow 15, shows a current path extending from one conductor, for example, 14, through the brush body 11 and into adjacent conductor 16. This latter circuit is generally referred to as an inductive one and consequently contains a certain amount of inductive energy that must be dissipated. If the energy from this circuit is not dissipated, then arcing occurs in localized spots and may cause melting or pitting of the commutator bar, being very detrimental to the brush assembly. Alternately, as the commutator rotates beneath the brush, arcing may occur from one edge of the commutator bar to the brush with a noticeable pitting of the entire edge of a commutator bar which also results in rough and uneven wear of the brush body 11. One of the simpler ways in which this inductive energy is dissipated is by means of a resistance where the resistance is the brush body 11 material which bridges the gap between a pair of adjacent commutator bars. When the brush has a sufficient resistivity, the inductive energy of the circuit is absorbed by heat released in brush body material 11, and being relatively a larger body, the heat is conducted or dissipated outwardly so that no injurious effects are present. In some applications, however, because of efficient design improvement and various compensating arrangements, this inductive circuit is of minor significance as is the inductive energy therein. Accordingly, it is highly desirable in these circumstances to employ a carbonaceous brush of lower resistivity. Lower resistivity increases the current carrying capacity of the brush, permits the brush to operate at cooler temperature, and may permit lighter or smaller commutator assemblies for overall greatly increased efficiency. However, it has been found that, lowering the resistivity of a brush by general means, for example, high firing does not change the temperature coefficient of resistivity, and may, in some instances, reduce the overall efficiency of the brush. Brushes that have been high fired only have not been found wholly satisfactory, for example, in operating at variable and high altitude conditions. Furthermore, a low resistivity brush may not operate satisfactorily under various temperature changing conditions because, brush graphite in itself is somewhat semiconductive. In other words, it has a negative temperature coefficient of resistivity so that as the temperature increases resistivity decreases.

It has been discovered that wear rate of an ordinary carbonaceous material brush may be reduced and the resistivity made more positive by the addition or incorporation of a vanadium compound in a brush body. Such addition or incorporation contemplates a final brush body including a vanadium compound therein. The "vanadium compound" may be provided in the brush body by the direct addition of preformed vanadium and vanadium compounds either singly or combined, or indirectly by decomposition or reaction, i.e., in situ formation, of vanadium containing materials. The term "vanadium compound" is intended to include not only vanadium itself but also compounds of vanadium which when added to the brush material remain in the final brush body in the added state, or undergo further changes either in chemical structure or due to reaction with the brush or added materials to form derivatives of vanadium, for example, vanadium oxides, sulfides, halides, carbide, hydride, nitride, mixed metal vanadyl salts, etc. Among such compounds are $VH$, $VN$, $VC$, $HVO_3$, $VI_2$, $V_2S_3$, $V_2S_2$, $V_2S_5$, $V_2O_5$, $V_2O_4$, $V_2O_3$, $VOBr$, silver vanadyl molybdate, $Ag_4V_2O_7$, etc.

A standard type of current conveying brush may be produced by various processes starting with, for example, carbon. Carbon may be pulverized, mixed with resin binders, compacted and fired. Firing temperatures may reach about 2500° C. and accordingly, the carbon may be wholly or partially graphitized and/or the binder medium carbonized. Carbon may also be previously graphitized and also may have included elements therein, for example, boron to lower the resistivity. Carbon brushes produced by the described process may have different resistivities, resistivities sensitive to firing temperatures, and resistivities not stable over wide ranges of operating conditions.

The addition of a vanadium compound to the carbonaceous material body in a range of a positive amount up to about 10%, by weight, based on the weight of the carbon, provides a predetermined stable resistivity, a more positive temperature coefficient of resistivity, and substantially improved characteristics as described. The manner of adding the compound as appearing in the following examples does not appear to be critical. With respect to positioning, various compounds may be added in small particles widely dispersed throughout the carbon body or added to the lubricating elements already in the carbon body whether as inserts, chunks or large particles, geometrically or irregularly dispersed.

EXAMPLE 1

Several 7 mil diameter carbon rods 1½ inches long were impregnated by dipping in molten $V_2O_5$ increasing the rod weight by 1 to 4%. Temperature coefficient of resistivity changed, from an initial negative $-5.8 \times 10^4$ per ° C. to positive, upon heat treating at about 1200° to 1400° C. More specifically, the room temperature (25° C.) resistivity of 4360 micro ohm-cm. was reduced to about 1750 micro ohm-cm., a reduction of about 60%. The reduction remained stable even after refiring to about 2300° C. An additional advantageous feature is that lowered resistivity takes place at about ordinary maximum kiln temperatures in carbon manufacture, below graphitization temperature.

EXAMPLE 2

Example 1 was repeated several times with progressive firing temperatures and with measurement of resistivity between firings. $V_2O_5$ upon reaction with carbon at about 400 to 700° C. forms $V_2O_4$. $V_2O_4$ reacts with carbon at about 1000° C. to form $V_2O_3$. $V_2O_3$ reacts with carbon at above 1000° C. to form $VC$. Measurements at all stages indicate a lowering or more positive resistivity for each of the compounds mentioned.

EXAMPLE 3

Powdered $V_2O_5$ was dissolved in water to provide a saturated solution and a 7 mil diameter 1½ inches long carbon rod was impregnated by submersion in the solution and boiling for about 5 minutes. A 0.15% weight increase was noted in the rod. The rod was then fired at about 1200 to 1400° C. and resistivity tests thereon indicated a drop at about 1200° C. to 1400° C. This drop was substantially more than that attributable to negative temperature coefficient of resistivity. The change or drop was permanent when referred to room temperature.

EXAMPLE 4

0.2 gram $V_2O_5$ powder, 0.2 gram Ag powder, and 0.6 gram $MoO_3$ powder were mixed together and melted. A 7 mil diameter carbon rod of 1.291 milligrams weight was submerged in this solution and impregnated for about 5 minutes. A weight gain of 0.268 milligram was noted. The rod was then fired at about 1200 to 1400° C. Resistivity tests indicated a final resistivity about that as given in Example 3 for the brush containing the vanadium compound.

EXAMPLE 5

A slurry of $VH$ was prepared with water and applied to a carbon rod of 7 mil diameter and about 1½ inches long. The rod was fired at about 1400° C. in vacuum. Initially the rod indicated a resistance of 108 ohms. After impregnation and heat treatment the resistance was measured at 89 ohms. Resistivity was about the same as that indicated for $V_2O_5$ addition in Example 1.

EXAMPLE 6

Vanadium metal was added to a 7 mil diameter 1½ inches long carbon rod by the common practice of employing a vanadium electrode and striking an arc between the vanadium electrode and the carbon rod. A 50 microfarad condenser was employed together with a suitable resistance and electrical pulses employed. The carbon rod showed evidence of vanadium by shiny silvery patches of vanadium thereon. Thereafter the rod was heat treated at about 1400° C. Resistance of the impregnated and treated rod was less than the original rod.

Many standard type brushes were produced and tested in accordance with this invention and various preferred forms of vanadium dispersal or utilization were employed. More specifically, the insert configuration as illustrated in the Savage Patent 2,736,830 (FIG. 1) and also as illustrated in FIG. 1 (17) of this invention may be employed with the vanadium contained in the inserts, alternately the vanadium compound may be dispersed in the chunks of FIG. 2 or in the matrix as illustrated in FIG. 3. The vanadium compound may be in any insert or additive, in the carbon or in both.

In considering the practicalities of additions to a carbon brush, it is well to employ those additive materials which react well or will provide the desired results when exposed to ordinary manufacturing heat treating temperatures or operating temperatures. In this respect among the more preferred additives are $VH$ and $V_2O_5$, and $VC$ which may be formed in situ. $V_2O_5$ whether added initially or formed in situ has been found to change the ordinarily negative temperature coefficient of resistivity of carbon to positive. Further advantages to be gained by the addition of $V_2O_5$ include a lowered resistivity which is stable, better bonding of the carbonaceous material because of the binding effect of $V_2O_5$ on carbon particles and additional lubrication because of this characteristic of $V_2O_5$ in combination with carbon.

FIG. 2 illustrates a modification of the inserts of FIG. 1. In FIG. 2, chunks or large particles 18 of a mixture of about 90% $MoS_2$ and 10% $Ag_2S$, by weight, are randomly dispersed throughout brush body 11. Chunks 18 in one preferred and working embodiment were obtained from these chunks or particles which would pass through a 20 mesh screen and be collected on a 60 mesh screen. From about 2 to 10%, by weight, of $V_2O_5$ with respect to the chunks provided good results in the chunk configuration when fired at about 705° C.

In FIG. 3, there is illustrated a brush body containing $V_2O_5$ in the carbon matrix in widely dispersed small particle form. This arrangement may also be employed with the insert or chunk configuration of FIGS. 1 and 2. From about 1 to 2%, by weight, $V_2O_5$ based on the weight of carbon provided good results in this configuration.

Various tests were performed with brushes containing $V_2O_5$ and fired at about 750° C. to 900° C. These tests were carried out on a standard type of generator rated at 300 amperes at sea level. Eight brushes were employed for each generator. Altitude and moisture conditions were simulated in an evacuated chamber. Generator speeds were varied to a maximum of 8000 r.p.m. In Table I the generator was operated for 100 hours at sea level, 100 hours at 35,000 feet simulated altitude at 300 amperes and 20 hours at 50,000 feet simulated altitude at 225 amperes. In Table II the tests were generally the same as in Table I with the exception that the altitude test periods were of 8-hour duration. The numbers in the tables are the average of eight brushes and indicate the projected life based on ¼ inch wear.

Table I

|  | Without $V_2O_5$ | Chunk | |
|---|---|---|---|
|  |  | $V_2O_5$ (2% of total weight) in matrix | $V_2O_5$ (2% of chunk weight) in chunks |
| Life hrs./¼″ sea-level | 779 | 598 | 850 |
| Altitude 35,000 ft | 509 | 909 | 862 |
| Altitude 50,000 ft | 532 | 1,111 | 862 |

Table II

|  | Without $V_2O_5$ | Chunk | |
|---|---|---|---|
|  |  | $V_2O_5$ (2% of total weight) in matrix | $V_2O_5$ (2% of chunk weight) in chunks |
| Life hrs./¼″ sea-level | 575 | 539 | 538 |
| Altitude 35,000 ft | 455 | 523 | 690 |
| Altitude 50,000 ft | 313 | 834 | 714 |

Tables I and II are clearly indicative of the improved performance in life hours of the brushes of this invention relative to altitude especially with respect to high altitudes.

In considering the addition of the described additives to various lubricant containing brushes, and more particularly to brushes incorporating molybdenum disulfide, tungsten disulfide, etc., together with a sulfide additive, reference is made to copending applications S.N. 830,483, Oliver et al., filed July 30, 1959 and S.N. 19,978, Oliver et al., filed March 23, 1960, each assigned to the same assignee as the present invention. The described additives and more particularly, $V_2O_5$, may be employed together with the teachings of these applications. Specifically, a carbon brush may employ, as lubricant, any one or more of the major disulfides of Mo, W, Zr, Ti, together with one or more additive sulfides. Ordinarily, care must be taken so that, in the firing ranges, the high temperatures do not deleteriously affect the already present lubricant and other materials in the brush to in turn injuriously affect the resistivity or wear rate. While it is, of course, understood that in some instances the firing temperatures may cause decomposition or reaction of the additive or such changes may be initiated by normal arcing conditions of operation, nevertheless a vanadium compound is present in the brush during operation.

While a specific method and apparatus in accordance with this invention has been shown and described, it is not desired that the invention be limited to the particular description nor to the particular configurations illustrated, and it is intended by the appended claims to cover all modifications within the spirit and scope of this invention.

What we claim as new and desire to secure by Letters Patent of the United States is:

1. An electrical contact brush comprising in combination, a brush body composed at least in part of graphitic carbon, and a vanadium compound.

2. The invention as recited in claim 1 wherein said vanadium compound is at least one member selected from the class consisting of vanadium, its oxides, sulfides, halides, VH, VN, VC, and $HVO_3$.

3. An electrical contact brush comprising in combination, a brush body composed at least in part of graphitic carbon, and vanadium.

4. An electrical contact brush comprising in combination, a brush body composed at least in part of graphitic carbon and VC.

5. An electrical contact brush comprising in combination, a brush body composed at least in part of graphitic carbon and $V_2O_5$.

6. An electrical contact brush comprising in combination, a brush body composed at least in part of graphitic carbon and VH.

7. A carbon electrical contact making brush comprising in combination, a carbonaceous body and a vanadium compound incorporated therein in positive amounts up to about 10% by weight of said body, said brush produced by incorporating a vanadium compound in said brush and firing at a temperature in the range of about 750 to 2400° C.

8. A carbon electrical contact making brush comprising in combination, a carbonaceous body and a vanadium compound incorporated therein in positive amounts up to about 10% by weight of said body, said brush produced by incorporating $V_2O_5$ in said brush and firing at a temperature in the range between about the melting point of $V_2O_5$ and 2400° C.

9. The invention as recited in claim 8 wherein said incorporation includes an admixture of said $V_2O_5$ and carbon so that the $V_2O_5$ is widely dispersed throughout said brush body.

10. The invention as recited in claim 9 wherein said incorporation includes incorporation within lubricant elements in said brush.

11. A chunk type carbon electrical contact making brush comprising in combination, a carbon brush matrix body, a plurality of lubricant chunks dispersed throughout said body and a vanadium compound in said brush, said brush produced in part by adding $V_2O_5$ thereto and firing at least above the melting point of $V_2O_5$.

12. The invention as recited in claim 11 where the said $V_2O_5$ is added to said matrix in positive amounts up to about 10%, by weight, of the matrix.

13. The invention as recited in claim 12 where the said $V_2O_5$ is added to said chunks in positive amounts up to about 10%, by weight, of said chunks.

14. The invention as recited in claim 13 where said chunks comprise by weight about 90 parts molybdenum disulfide, and 10 parts silver sulfide.

15. A method of providing a lower resistivity brush which comprises mixing a carbonaceous material together with about up to 10%, by weight, of a vanadium compound, based on the total weight of the latter and the carbonaceous material, compacting said mixture, and firing said mixture above the melting point of the vanadium compound.

16. A method of providing a lower resistivity brush which comprises mixing a carbonaceous material together with about up to 10% $V_2O_5$ by weight of the mixture, compacting said mixture, and firing said mixture above the melting point of the $V_2O_5$.

17. In a dynamoelectric machine having a stator and rotor construction, and a commutator connected to said rotor, the improvement of an electrical brush in contact with said commutator, said brush being further characterized by comprising a carbon body, and a vanadium compound incorporated therewith to provide increased life of said brush.

References Cited in the file of this patent

UNITED STATES PATENTS

| | | |
|---|---|---|
| 1,887,559 | Marcelus | Nov. 17, 1932 |
| 2,777,081 | Miner | Jan. 8, 1957 |
| 2,854,597 | Foote | Sept. 30, 1958 |
| 2,946,907 | Titus | July 26, 1960 |